United States Patent [19]

Hofmann

[11] Patent Number: 4,713,763

[45] Date of Patent: Dec. 15, 1987

[54] REGULATING APPARATUS WHICH INFLUENCES A MIXTURE-FORMING INSTALLATION OF AN INTERNAL-COMBUSTION ENGINE OF A MOTOR VEHICLE

[75] Inventor: Rainer Hofmann, Stuttgart, Fed. Rep. of Germany

[73] Assignee: Daimler-Benz Aktiengesellschaft, Stuttgart, Fed. Rep. of Germany

[21] Appl. No.: 698,797

[22] Filed: Feb. 6, 1985

[30] Foreign Application Priority Data

Feb. 7, 1984 [DE] Fed. Rep. of Germany ....... 3404154

[51] Int. Cl.[4] .............................................. B60K 41/04

[52] U.S. Cl. ............................ 364/424.1; 364/431.01; 74/859; 74/860

[58] Field of Search ...................... 364/431.01, 431.08, 364/424, 424.1, 551, 508; 74/859, 860; 73/769, 862.36

[56] References Cited

U.S. PATENT DOCUMENTS

| | | | |
|---|---|---|---|
| 3,939,738 | 2/1976 | Aday et al. | 74/859 |
| 4,008,567 | 2/1977 | Hirsch | 364/424.1 |
| 4,286,324 | 8/1981 | Ingram | 364/431.01 |
| 4,346,625 | 8/1982 | Latsch et al. | 74/860 |
| 4,467,427 | 8/1984 | Magnusson | 364/424.1 |
| 4,538,571 | 9/1985 | Buck et al. | 74/859 |
| 4,541,052 | 9/1985 | McCulloch | 364/424.1 |
| 4,606,005 | 8/1986 | Ribbens | 364/431.01 |

FOREIGN PATENT DOCUMENTS

| | | | |
|---|---|---|---|
| 0200938 | 11/1984 | Japan | 364/508 |

*Primary Examiner*—Parshotam S. Lall

[57] ABSTRACT

According to the present invention, the improved apparatus provides a feedback control system for regulating an explosive-mixture forming device of a vehicle having an engine, accelerator pedal means for controlling the speed of the engine, a drive train including a drive shaft, a flywheel on the drive shaft, a gearbox having a plurality of gear stages, and a wheel assembly including at least one driven wheel. The apparatus includes first sensor means for detecting deflection of the accelerator pedal means, second sensor means for detecting the angular velocity of the drive shaft flywheel, third sensor means for detecting the torque of the drive shaft, fourth sensor means for detecting the angular velocity of the at least one driven wheel of the wheel assembly, and fifth sensor means for detecting the identity of the gear stage in use in the gearbox. The apparatus further includes feedback control means for attenuating vibration in the vehicle drive train, the feedback control means including data processing means for interpreting the parameters detected by the first, second, third, fourth, and fifth sensor means to monitor torsional vibrations in the drive train, and regulator means for controlling the explosive-mixture forming device to vary the quantity of explosive-mixture formed to vary thereby the torque of the engine so that vibration due to torsional rigidity of the drive train is lessened substantially.

3 Claims, 3 Drawing Figures

REGULATING APPARATUS WHICH INFLUENCES A MIXTURE-FORMING INSTALLATION OF AN INTERNAL-COMBUSTION ENGINE OF A MOTOR VEHICLE

BACKGROUND AND SUMMARY OF THE INVENTION

The invention relates to an apparatus for regulating operation of a carburetor or other explosive mixture-forming means. More particularly, this invention relates to a sensor and feedback control system for regulating operation of the carburetor or other explosive mixture-forming means in an internal-combustion engine of a motor vehicle to reduce vibration in the vehicle drive train during torque transmission.

A device to regulate an engine-gearbox unit of a motor vehicle is known from German Unexamined Published Pat. Application No. 2,811,574, which, as a function of the accelerator pedal position and of the rotary speed of the drive shaft, influences the mixture former of the engine and the gearbox so that the lowest possible fuel consumption is obtained. One disadvantage of this known regulating device is that the vibration behavior of the drive train is not taken into consideration in the regulation.

According to the present invention, the improved apparatus provides a feedback control system for regulating an explosive-mixture forming device of a vehicle having an engine, accelerator pedal means for controlling the speed of the engine, a drive train including a drive shaft, a flywheel on the drive shaft, a gearbox having a plurality of gear stages, and a wheel assembly including at least one driven wheel. The apparatus includes first sensor means for detecting deflection of the accelerator pedal means, second sensor means for detecting an angular velocity of the drive shaft flywheel, third sensor means for detecting the torque of the drive shaft, fourth sensor means for detecting an angular velocity of the at least one driven wheel of the wheel assembly, and fifth sensor means for detecting the identity of the gear stage in use in the gearbox.

The apparatus further includes feedback control means for attenuating vibration in the vehicle drive train, the feedback control means including data processing means for interpreting the parameters detected by the first, second, third, fourth, and fifth sensor means to monitor torsional vibrations in the drive train, and regulator means for controlling the explosive-mixture forming device to vary the quantity of explosive-mixture formed to vary thereby the torque of the engine so that vibration due to torsional rigidity of the drive train is lessened substantially.

The aim of the invention is to attenuate the vibrations which occur in the drive train of a vehicle in the case of a load change.

The regulating apparatus according to the present invention operates to influence an explosive mixture-forming device (e.g. a carburetor) of an internal-combustion engine of a motor vehicle and advantageously prevents the low-frequency natural vibrations of the drive train which cause extremely high moments in the drive train. Thus, the improved regulating apparatus prolongs the useful life of the gearbox and that of the power-transmitting elements and simultaneously improves travelling comfort due to the elimination of the vibrations and to the provision of a uniform drive movement. The regulating device of the present invention is applicable in either a spark-ignition or a compression-ignition internal-combustion engine.

Further objects, features, and advantages of the present invention will become more apparent from the following description when taken with the accompanying drawing which shows, for purpose of illustration only, an embodiment in accordance with the present invention.

DETAILED DESCRIPTION OF THE DRAWING

Figure 1:
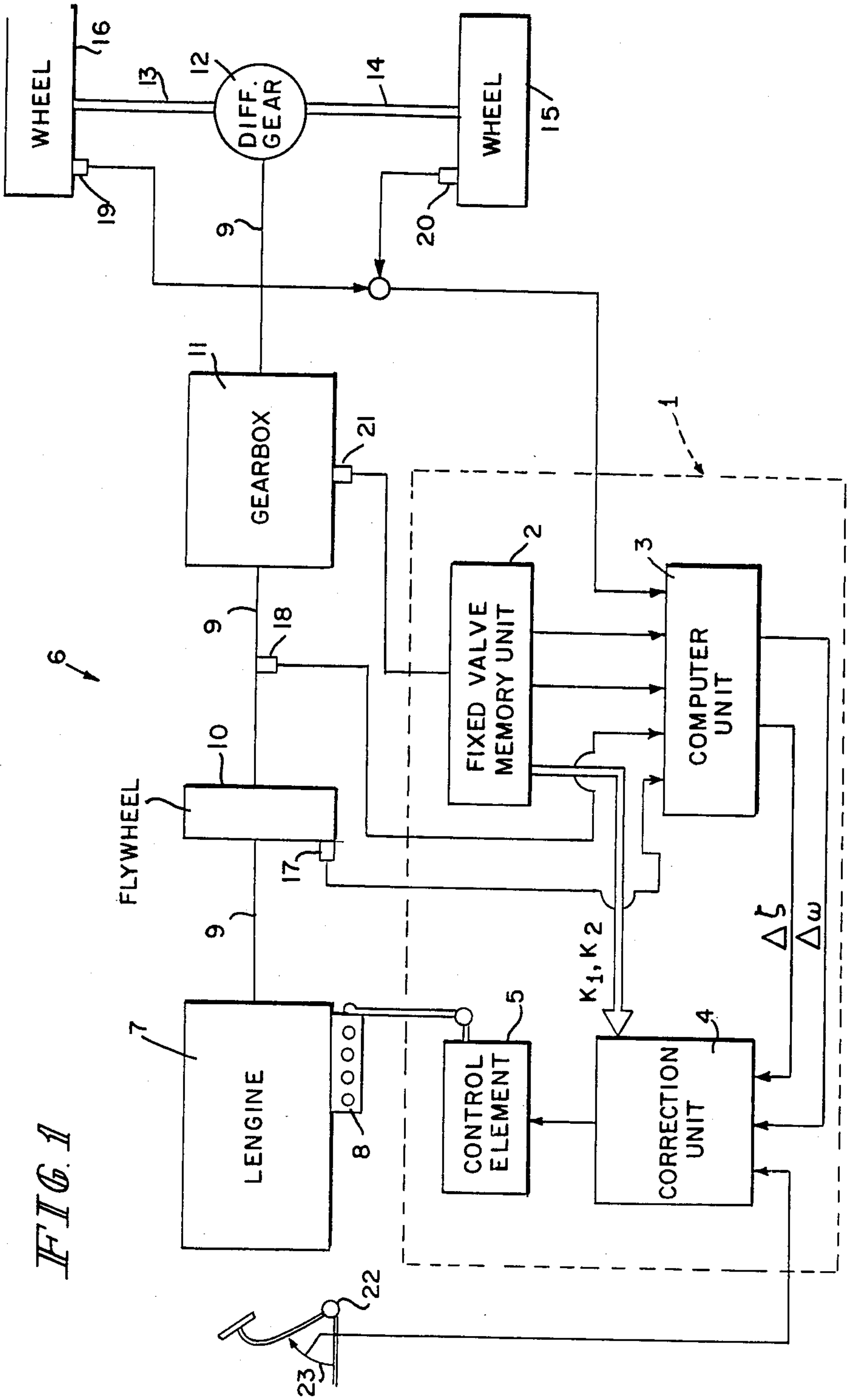
FIG. 1 shows a diagrammatical representation of a drive train of a motor vehicle having a regulating apparatus according to the present invention.

Regulated apparatus, designated 1 in FIG. 1, comprises a fixed value memory unit 2 such as a ROM, a computer unit 3, a correction unit 4, which are constituents of a microprocessor system, and a control element 5. A drive train 6 of a commercial vehicle, for example, comprises an internal-combustion engine 7 having an explosive mixture-forming device 8 such as a carburetor in a spark-ignition engine or a fuel injection means in a compression-ignition engine, drive shaft 9 with a flywheel 10, a gearbox 11, and a differential gear 12 from which axle shafts 13, 14 lead to the driven wheels 15, 16. A measuring sensor 17 to detect the angular velocity is associated with the flywheel 10, a measuring sensor 18 to detect the torsional moment with the drive shaft 9, measuring sensors 19, 20 to detect the angular velocity with the driven wheels 15, 16, and the identity of the gear stage in use at the time of detection is detected by a measuring sensor 21 arranged on the gearbox. The measuring sensors 17 to 21 communicate with the regulating apparatus 1 via signal transmission lines. A deflection of an accelerator pedal 22 is detected by a measuring sensor 23 and fed by a signal transmission line to the regulating apparatus 1.

Figure 2:
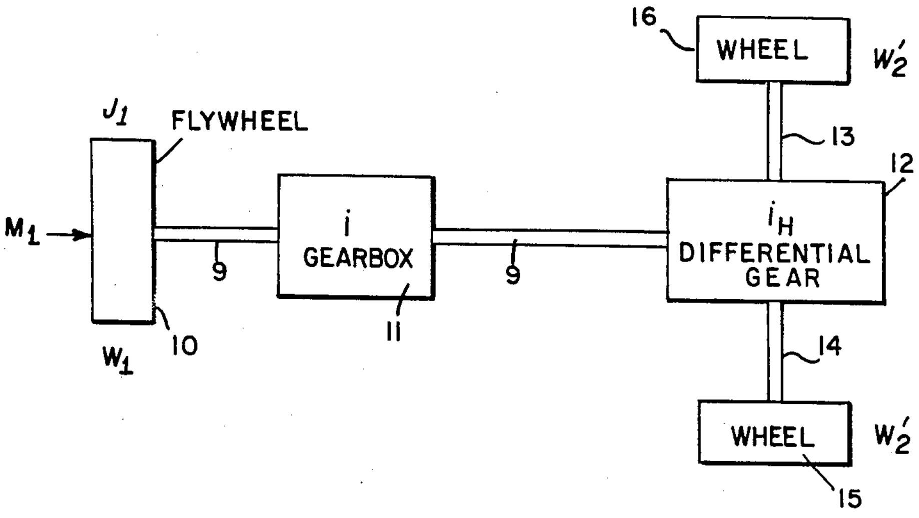
FIG. 2 shows another diagrammatic model of a vehicle.

A motor vehicle is illustrated in FIG. 2 as a multi-mass system, in which an internal-combustion engine moment $M_1$ acts upon a flywheel 10 of the internal-combustion engine having a mass moment of inertia $J_1$, while an angular velocity $\omega_1$ is adjusted. The further transmission of power occurs by the drive shaft 9, in which the gearbox 11 is interposed, to the differential gear 12, and from there by the drive shafts 13, 14 to the driven wheels 16, 15, which exhibit an angular velocity $\omega'_2$, and which are engaged by a load moment $M'_2$ due to external forces.

Figure 3:
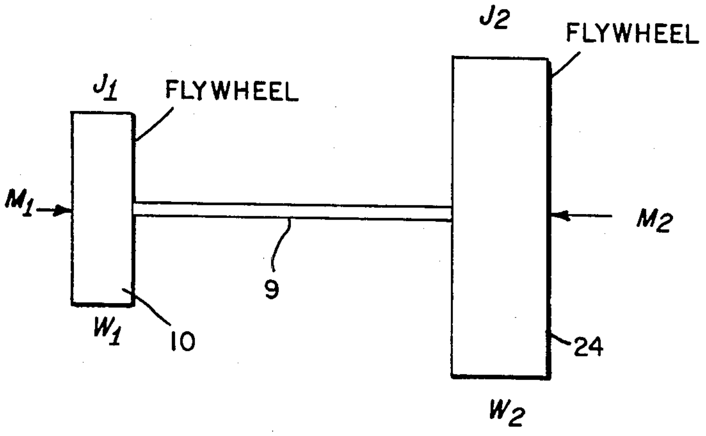
FIG. 3 shows still another diagrammatic model of a vehicle which is a reduced model of the vehicle according to FIG. 2.

FIG. 3 illustrates a reduced model of the vehicle, which is derived from the model of the vehicle illustrated in FIG. 2. The internal-combustion engine $M_1$ acts at an angular velocity $\omega_1$ upon the internal-combustion engine flywheel 10 having the mass moment of inertia $J_1$. A flywheel 24 representative of the vehicle mass, having an angular velocity $\omega_2$ has a mass moment of inertia $J_2$. The flywheel 24 representative of the vehicle is engaged by a load moment $M_2$ reduced on the gearbox input side. The internal-combustion engine flywheel 10 and the flywheel 24 representative of the vehicle are connected by the drive shaft 9*, which transmits a torsional moment M. A correlation existinq between the vehicle model and the reduced vehicle model can be described by the relations:

$$\omega_2 = (i)(i_H)(\omega'_2) \quad (1)$$

$$J_2 = \frac{mr^2}{(i^2)(i_H^2)}\text{, and} \quad (2)$$

$$M_2 = \frac{M'_2}{(i)(i_H)} \quad (3)$$

wherein $\omega_2$=angular velocity of the flywheel 24 representative of the vehicle, i=transmission ratio of the gearbox, $i_H$=transmission ratio of the differential gear, $\omega'_2$=mean angular velocity of the driven wheels, $J_2$=mass moment of inertia of a representative flywheel upstream of the gearbox imagined as representative of the vehicle, m=mass of vehicle, r=radius of a driven wheel, $M_2$=load moment, reduced to the gearbox input side, and $M'_2$=load moment acting upon the driven wheels.

A comparative moment of mass inertia J can be determined in accordance with the relation:

$$\frac{1}{J} = \frac{1}{J_1} + \frac{1}{J_2} \quad (4)$$

The equations of movement:

$$\frac{a(\Delta\omega)}{dt} = \frac{M_1}{J_1} - \frac{M}{J} - \frac{M_2}{J_2}\text{, and} \quad (5)$$

$$\frac{a(\Delta\phi)}{dt} = \Delta\omega \quad (6)$$

can be drawn up for the reduced vehicle model, wherein $\Delta\omega$=difference of angle velocity of internal-combustion engine flywheel and vehicle-representative flywheel, and $\Delta\phi$=angle of twist of the torsion shaft imagined as representative for the drive train between internal-combustion engine flywheel and vehicle-representative flywheel The torsional moment M is proportional to the twist $\Delta\phi$ and can be described by the relation $$M=(C)(\Delta\phi) \quad (7)$$

wherein, c=torsional rigidity of the drive shaft (9*).

Associated with a given accelerator pedal position is a desired torque $M_{1s}$ which influences the regulating apparatus 1 in accordance with the regulation law:

$$M_1=M_{1s}-K_1\Delta\omega+K_2\phi \quad (8)$$

by the control element, which influences the explosive mixture-forming installation, particularly the injection pump of a self-igniting internal-combustion engine of a commercial vehicle, so that the internal-combustion engine moment $M_1$ is adjusted. $K_1$, and $K_2$ are coefficients.

The overall system regulated in this manner can be described by the differential equations:

$$\frac{a(\Delta\omega)}{dt} = \quad (9)$$

$$\frac{-K_1}{J_1}(\Delta\omega) + \left\{\frac{K_2}{J_1} - \frac{c}{J}\right\}(\Delta\phi) + \frac{M_{1s}}{J_1} - \frac{M_2}{J_2}$$

$$\frac{a(\Delta\phi)}{dt} = \Delta\omega \quad (10)$$

A formulation of an exponential solution ($e^{pt}$) for the homogeneous part in the calculation of the inherent values p leads to the characteristic equation $$p^2 + \frac{K_1p}{J_1} + \frac{c}{J} - \frac{K_2}{J_1} = 0 \quad (11)$$

From the foregoing it is possible to deduce the conditions under which the regulated movement is stable:

$$K_1 > 0 \text{ and } K_2 < \left(1 + \frac{J_1}{J_2}\right)(c) \quad (12)$$

When equation (11) is compared with the general characteristic equation of a 2nd order system $$p^2+2D\omega_o p+W_o^2=o$$

the attenuation "D" can be described by the relation:

$$D = \frac{K_1}{2J_1\left\{\frac{c}{J} - \frac{K_2}{J_1}\right\}^{\frac{1}{2}}} \quad (13)$$

and the inherent cyclic frequency $\omega_0$ by the relation:

$$\omega_o = \left\{\frac{c}{J} - \frac{K_2}{J_1}\right\}^{\frac{1}{2}} \quad (14)$$

The coefficients $K_1$ and $K_2$ for the regulation law (8) are adjusted so that the desired attenuation "D" and the inherent frequency $\omega_o$ are obtained.

During the operation of a commercial vehicle having a self-igniting internal-combustion engine, a desired internal-combustion engine torque is dictated by the driver through the accelerator pedal 22. The accelerator pedal position signal, which is detected by the measuring sensor 23, is fed as a governing parameter to the correction device 4 to cause a movement of the adjusting lever of the injection pump of the mixture-forming installation 8. The regulating apparatus operates to vary the torque of the internal-combustion enqine so that vibrations due to the torsional rigidity of the drive train are virtually prevented. The angular velocity $\omega_1$ of the internal-combustion engine flywheel, the torsional moment M, the transmission ratios i, and the angular velocity of the driven wheels $\omega_2$, are detected and fed to the regulating apparatus 1. The torsional moment M as a controlled parameter, and $\omega_1$, $\omega_2$ as further state parameters, are fed to the computer unit 3. The coefficients $K_1$, $K_2$, the torsional rigidity "c" of the drive train and the overall transmission ratio (i)($i_H$) is read out from the fixed value memory unit 2 as a function of the gear stage engaged in the gearbox 21. In the computer unit 3, the angle of twist $\Delta\phi$ is formed from these values in accordance with the relation (7), and the difference $\Delta\omega$ of the angular velocity $\omega_1$of the internal-combustion engine flywheel 10 and the angular velocity $\omega_2$ of the vehicle-representative flywheel 24 is obtained in accordance with the relation:

$$\Delta\omega = \omega_1 - (i)(i_H)(\omega'_2) \tag{15}$$

and the latter and the coefficients $K_1$ and $K_2$ are fed as feedback parameters to the correction unit 4. In the correction unit 4, an output parameter which influences the control element 5 is determined by the regulation law (8) from the governing parameter and the feedback parameters, whereby, for example, the adjusting lever of the injection pump is modified in position so that the drive moment desired by the driver, which can be transmitted free from vibration via the drive shaft 9 and the axle shafts 13, 14 to the driven wheels 15,16, is finally adjusted.

In a further embodiment of the invention, in an externally-ignited internal-combustion engine, the throttle flap of a carburetor is influenced by the control parameter.

Although the invention has been described in detail with reference to certain perferred embodiments and specific examples, variations and modifications exist within the scope and spirit of the invention as described and defined in the following claims.

What is claimed is:

1. In a vehicle having an engine, an explosive-mixture forming device such as a carburetor or injection system, deflectable accelerator pedal means for controlling the speed of the engine, a drive train including a drive shaft, a flywheel on the drive shaft, a gearbox having a plurality of gear stages, and a wheel assembly having at least one driven wheel, the improvement comprising:

first sensor means for detecting deflection of the accelerator pedal means, second sensor means for detecting an angular velocity of the flywheel, third sensor means for detecting the torque of the drive shaft, fourth sensor menas for detecting an angular velocity of the at least one driven wheel of the wheel assembly, fifth sensor means for detecting the identity of the gear stage in use in the gearbox, and feedback control means for attenuating vibration in the vehicle drive train, the feedback control means including data processing means for receiving information from the first, second, third, fourth, and fifth sensor means and for monitoring vibrations in the drive train, and regulator means for controlling the explosive-mixture forming device to vary the quantity of explosive-mixture formed to vary thereby the torque of the engine so that vibration due to torsional rigidity of the drive train is lessened substantially, wherein the data processing means includes a read-only memory unit, responsive to a parameter detected by the fifth sensor means, for supplying auxiliary control parameters including a parameter related to the angular velocity and torque of the drive shaft, a parameter related to the angular velocity of the at least one driven wheel, and a parameter related to a difference in the angular velocity and an angle of twist of the drive train, the control parameters supplied by the read-only memory unit being functionally related to the identity of the gear stage in use in the gearbox as detected by the fifth sensor means so that the control parameters are variable in response to a change in the gear stage, and wherein the read-only memory unit supplies a plurality of additional auxiliary control parameters including a parameter related to the torsional rigidity of the drive train as a function of the gear stage in use in the gearbox.

2. The improvement of claim 1, wherein the regulator means includes a correction unit, and the control parameters supplied by the read-only memory unit are fed to the correction unit.

3. The improvement of claim 1, wherein the correction unit of the regulator means includes means for storing a program including the step of calculating the torque of the engine in accordance with the following equation:

$$M_1 = M_{1S} - K_1^{\Delta\omega} + K_2\Delta\phi$$

wherein: $M_1$ is the torque of the engine, $M_{1S}$ is the desired torque, $\Delta\omega$ is the difference in the angular velocity of the engine flywheel and a representative flywheel, and $\Delta\phi$ is the angle of twist of an imaginary torsion shaft representative of the drive train, and $K_1$ and $K_2$ are coefficients where:

$K_1 > 0$, and $K_2 < (1 + J_1/J_2(c)$ wherein: c is the parameter related to the torsional rigidity of the drive train, $J_1$ is the mass moment of inertia of the engine flywheel, and $J_2$ is the mass moment of inertia of a flywheel representative of the vehicle mass.

* * * * *